United States Patent
Scholz

(10) Patent No.: US 10,392,811 B2
(45) Date of Patent: Aug. 27, 2019

(54) BUILDING ELEMENT IN PLATE SHAPE, IN PARTICULAR FLOOR COVERING PANEL, AS WELL AS FLOOR COVERING FORMED BY USING SAID BUILDING ELEMENTS, AND METHOD FOR THEIR ARRANGEMENT

(71) Applicant: Karl-Heinz Scholz, Hösbach (DE)

(72) Inventor: Karl-Heinz Scholz, Hösbach (DE)

( * ) Notice: Subject to any disclaimer, the term of this patent is extended or adjusted under 35 U.S.C. 154(b) by 0 days.

(21) Appl. No.: 15/405,764

(22) Filed: Jan. 13, 2017

(65) Prior Publication Data
US 2017/0204616 A1 Jul. 20, 2017

(30) Foreign Application Priority Data
Jan. 14, 2016 (DE) .................. 10 2016 100 608

(51) Int. Cl.
| | | |
|---|---|---|
| *E04F 15/10* | (2006.01) | |
| *E04F 15/02* | (2006.01) | |
| *B32B 13/04* | (2006.01) | |
| *E04F 15/08* | (2006.01) | |

(52) U.S. Cl.
CPC ........ *E04F 15/02016* (2013.01); *B32B 13/04* (2013.01); *E04F 15/08* (2013.01); *E04F 15/107* (2013.01); *B32B 2419/04* (2013.01); *E04F 2201/0511* (2013.01); *E04F 2201/07* (2013.01)

(58) Field of Classification Search
CPC ..... E04F 15/02016; E04F 15/04; E04F 15/02; E04F 2201/07; E04F 15/02011; E04F 15/10; E04F 2201/05
See application file for complete search history.

(56) References Cited

U.S. PATENT DOCUMENTS

| | | | | |
|---|---|---|---|---|
| 4,599,841 A | * | 7/1986 | Haid | E04F 15/04 52/396.04 |
| 4,817,963 A | * | 4/1989 | Munden | B63B 5/065 277/316 |
| 6,363,677 B1 | * | 4/2002 | Chen | E04F 15/02 52/384 |
| 9,611,659 B2 | * | 4/2017 | Baert | E04F 15/02188 |
| 10,059,072 B2 | * | 8/2018 | Hannig | B29D 99/001 |
| 2002/0121064 A1 | * | 9/2002 | Erwin | E01C 5/22 52/586.1 |
| 2004/0020159 A1 | * | 2/2004 | Nelson | E04F 15/04 52/741.4 |

(Continued)

FOREIGN PATENT DOCUMENTS

| | | |
|---|---|---|
| DE | 297 10 175 | 9/1997 |
| DE | 100 44 016 | 3/2002 |

(Continued)

*Primary Examiner* — Brian D Mattei
*Assistant Examiner* — Daniel J Kenny
(74) *Attorney, Agent, or Firm* — Wenderoth, Lind & Ponack, L.L.P.

(57) ABSTRACT

The invention relates to a building element in plate shape, in particular a floor covering panel, which, apart from a mineral carrier plate or a carrier plate of WPC, comprises an upper side wear layer as well as preferably a lower side levelling layer, as well as to a floor covering formed by using such building elements, and to a method for the arrangement thereof, wherein the side faces thereof comprise a non-locking profile for forming special joints for receiving a material for forming a connection element.

18 Claims, 2 Drawing Sheets

(56) References Cited

U.S. PATENT DOCUMENTS

| | | | | |
|---|---|---|---|---|
| 2004/0229020 | A1* | 11/2004 | LaBorde | B32B 3/02 |
| | | | | 428/192 |
| 2007/0006543 | A1* | 1/2007 | Engstrom | E04F 15/02 |
| | | | | 52/582.1 |
| 2008/0245014 | A1* | 10/2008 | Carter | E04F 15/02016 |
| | | | | 52/464 |
| 2011/0183101 | A1* | 7/2011 | Voith | E04F 15/02 |
| | | | | 428/53 |
| 2012/0066996 | A1* | 3/2012 | Konstanczak | E04F 13/08 |
| | | | | 52/588.1 |
| 2012/0240502 | A1* | 9/2012 | Wilson | E04F 15/14 |
| | | | | 52/416 |
| 2014/0360117 | A1* | 12/2014 | Ko | E04F 15/02016 |
| | | | | 52/309.1 |

FOREIGN PATENT DOCUMENTS

| | | |
|---|---|---|
| DE | 201 20 704 | 4/2002 |
| DE | 10 2004 054 785 | 7/2006 |
| DE | 10 2005 017 392 | 10/2006 |
| DE | 20 2015 100 159 | 1/2015 |
| EP | 1 584 770 | 10/2005 |
| JP | 2009-35934 A * | 2/2009 |
| WO | 98/58142 | 12/1998 |
| WO | 2015/005860 | 1/2015 |

\* cited by examiner

BUILDING ELEMENT IN PLATE SHAPE, IN PARTICULAR FLOOR COVERING PANEL, AS WELL AS FLOOR COVERING FORMED BY USING SAID BUILDING ELEMENTS, AND METHOD FOR THEIR ARRANGEMENT

BACKGROUND OF THE INVENTION

1. Field of the Invention

The invention relates to a building element in plate shape, in particular a floor covering panel, which, apart from a mineral carrier plate or a WPC-containing carrier plate, comprises a wear layer on the upper surface as well as, preferably, a levelling layer on the lower surface, as well as to a floor covering formed by using said building elements, and to a method for their arrangement.

2. Related Art

In the field of floor coverings, often laminate floor coverings with mechanical locking means, so-called click systems, are applied, which, in a simple manner, allow the positive-locking connection of adjacent panels in order to obtain a seamless and stable covering plane. Constructions of this kind are known, for example, by DE 297 10 175 U1 or are also known by DE 201 20 704 U1 or WO 98/58142 A1.

Usually, such floor coverings are composed of three different material layers. Therein, the center layer, which mostly consists of high density wood fiber boards (HDF), has the purpose of permanently carrying the decorative surface, which mostly consists of impregnated decor papers. Moreover, the center layer comprises a modified tongue and groove profile, which allows locking adjacent panels together in a positive fit by snapping on or turning in.

To all known systems of this kind, it is inherent in the system that the respective opposite sides within a panel have very different edge shapes in order to allow a respective positive fit with the adjacent panel. These profiles, which respectively engage form-fittingly into the adjacent panels and which overlap in a staggering manner, however, show the disadvantage that single panels cannot be removed in a damage-free way, for example, for inspection purposes of the subfloor or a hollow floor situated underneath.

A further disadvantage of the above-described snap-on floor coverings with high-density wood fiber boards is the tendency thereof to take up water, in liquid as well as in vapor condition, and to grow in thickness as well as in length and width. Due to these partly high alterations in volume and length/width, floor coverings of the mentioned kind may undergo significant damage, with the consequence of having to exchange the whole floor covering.

Even with a proper use of the floor coverings with standard constructional temperature and humidity variations, a restriction to partial surfaces of approximately 40-60 $m^2$ per single surface is necessary, including expansion joints arranged there between, which allow a damage-free shrinking and expanding of the partial surfaces in mutual respect.

In DE 10 2005 017 392 A1 or in DE 20 2015 100 159 U1, a floor panel is mentioned, which also comprises a mineral carrier layer, as well as a wear layer on the upper side and a counter layer on the lower side, and which is form-fittingly interconnected by means of mechanical coupling means.

SUMMARY OF THE DISCLOSURE

Starting from the state of the art, the invention is based on the task of providing a floatingly installable, stable and moisture-resistant building element in plate shape, in particular a floor covering panel, which, in case of need, can be removed from the panel plane, i.e. from the panel assembly, in a damage-free manner and without much effort and, after successful inspection of the underlying floor, can also be re-inserted floatingly into the panel plane, without visible alteration of the surface appearance of the floor covering.

A first aspect of the invention, thus, a first solution variant of the problem, is provided by a building element in plate shape showing the features of claim 1.

A second solution variant of the problem in accordance with the invention is provided by a building element in plate shape showing the features of claim 2.

Advantageous further developments of the floor covering panel of the invention are an object of the dependent claims.

The invention is preferably applied with building elements having at least one pair of parallel opposite edges. In such case, preferably both edges of said pair of opposite edges are provided with a non-locking profile. Herein the non-locking profile provided at said both edges may be different, similar or identical in some or all aspects. For example, the non-locking profiles may be identical in that they both basically comprise a recess in inward body direction in respect to the lower edge of the respective side face and a groove chamber also extending in inward body direction. The groove maybe delimited by an upper and lower groove lip. Preferably the lower groove lip protrudes beyond the upper groove lip, and preferably also beyond the upper edge, so as to from a lower protrusion of the respective side face. Of course, the non-locking profiles may also be completely identical and both comprise an identical recess and groove.

Preferably all edges, side faces respectively, of the building element comprise a non-locking profile. Said non-locking profiles may two by two, or all, be different, similar or identical. Preferably also in this case, two non-locking profiles may be identical in that they basically comprise a recess in inward body direction in respect to the lower edge of the respective side face and a groove chamber also extending in inward body direction. The groove maybe delimited by an upper and lower groove lip. Preferably the lower groove lip protrudes beyond the upper groove lip, and preferably also beyond the upper edge, so as to from a lower protrusion of the respective side face. Of course, all non-locking profiles may also be completely identical and both comprise an identical recess and groove.

As is clear from the above, the non-locking profiles applied in connection with the present invention preferably comprise a groove extending in inward body direction. Preferably such groove comprises at least an undercut of the respective side face, either in the upper groove lip, in the lower groove lip, or in both groove lips.

Preferably a protrusion is formed at one or more of the side faces of the building elements of the invention, wherein such protrusion preferably defines the width of the joint between adjacent building elements in an installation. The definition of the width may be realized by engaging or contacting said protrusion with the side face of an adjacent building element, e.g. with a protrusion formed on the side face of said adjacent building element. The protrusion may for example be a lower groove lip of one of the aforementioned non-locking profiles, but may also be formed differently, for example as a local protruberance or bulge at the respective side face.

According to a preferred embodiment of the invention, the plate-shaped building elements according to the first and also those according to the second solution variant are applied for providing a floor covering, wherein an exposed joint formed respectively between two adjacent building elements, including the preferred, e.g. horizontal, groove chambers which are spatially connected to this exposed joint, are filled up with a joint-filling material in order to interconnect the building elements.

It is clear that filling up the exposed joints leads to a connection between two adjacent building elements having the interposed filled-up joint. In the case of non-locking profiles also comprising a groove chamber extending inwards into the body of the building element, a firmer connection at least in the vertical direction perpendicular to the plane of connected building elements is reached. In the case the groove chamber comprises one or more undercuts of the respective side face, a firmer connection at least in the horizontal direction perpendicular to the joint between the connected building elements is obtained.

It is further clear that such exposed joints, which are later on filled, are preferably formed between the building element and each of its surrounding building elements in a floor covering installation. Preferably the filled joint is available at the surface of the installation. In such case the filling material may mimic the appearance of a grouting material. Especially in the cases of a building element being a stone or ceramic material or forming an imitation thereof, such embodiment is beneficial. Also in other cases, the accessibility of the filled joint at the surface is beneficial, since it may warrant a damage-free removal or dismounting of panels. This may be performed by simply cutting open the joint or filling material by means of a joint cutter or carpet knife such, that the panels can be removed from the panel plane.

Preferably said exposed joint between two adjacent building elements is closed at its lower side, preferably by a portion of one or both of said adjacent building elements, for example by means of the aforementioned protrusions formed at one or more of the side faces of the building elements concerned. Said closed configuration of the exposed joint is preferably available along essentially the complete length, or at least 90 percent of said length, of the respective side faces. In such case, a floating installation of the building elements can fluently be obtained and a complete acoustic uncoupling of the panel layer from the building structure is guaranteed.

The subject of the invention is based on a multi-layered plate shaped building element, which substantially consists of a carrier plate, the upper side of which is a wear layer or carries a wear layer as an additional layer, and the lower side of which is preferably a levelling layer, or at the lower side of which preferably additionally a levelling layer is provided. The center layer of the floor covering panel, thus, the carrier plate, is preferably free from PVC and plasticizers, and moreover is preferably incombustible and waterproof. It, preferably its lateral faces, the edges of the building element, respectively, can be provided with profiles, particularly said non-locking profiles, and cut to size with customary processing tools, preferably with wood processing tools.

The levelling layer, which according to a preferred embodiment of the invention is arranged on the lower side, is able to compensate for minor, point-shaped unevennesses of the underlying layer without destabilization of the plate layer and moreover to provide for an acoustic uncoupling of the element from the underlying layer.

BRIEF DESCRIPTION OF THE DRAWINGS

With the intention of better showing the characteristics of the invention, herein below, as an example without any limitative character, some preferred embodiments are described, with reference to the accompanying drawings, wherein.

DETAILED DESCRIPTION OF PREFERRED EMBODIMENTS OF THE INVENTION

Figure 1:
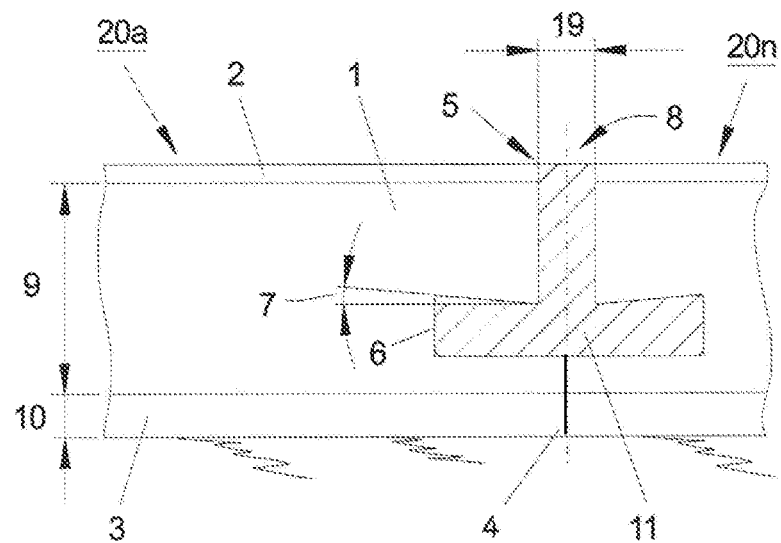
FIG. 1 represents a cross-section of a joint between two building elements in accordance with the invention.
Figure 2:
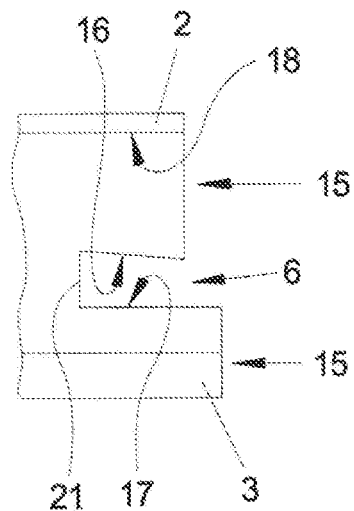
FIG. 2 at the same scale shows the non-locking profile provided at the side face of the building elements of FIG. 1.
Figure 3:
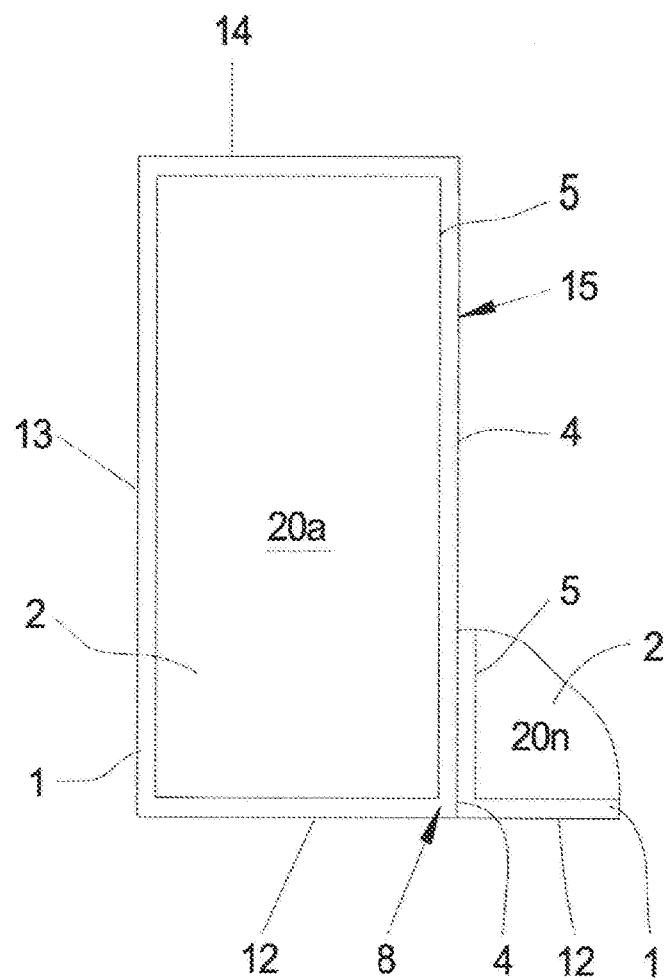
FIG. 3 gives a top view two such adjacent building elements.

In FIGS. 1, 2 and 3, the basic idea of the invention is represented. According to the illustrated preferred embodiment of the invention, each plate or panel element 20a, 20n—building element in plate shape—, more exactly the floor covering formed of such plate-shaped building elements 20a to 20n, comprises a circumferentially similarly formed system joint 8—see FIG. 3—, which, due to the recess of the upper edge 5 of the building element in respect to the lower edge 4 of the building element, when laying together adjacent panels 20a, 20n forms a uniform joint chamber 8 of defined width 19, which reaches up to the upper side of the panel edges 5—see FIG. 1—, such that spacers of any kind in order to obtain a uniform joint can be omitted.

Each building element in plate shape 20a, 20n consists of a carrier plate 1, a wear layer 2 arranged on the carrier plate 1 and a levelling layer 3 arranged on the lower side of the carrier plate 1. Each building element in plate shape 20a, 20n comprises at least two side faces; in the embodiment example shown in the figures, four side faces 12, 13, 14 and 15.

Each of the provided side faces comprises, in the example, an identical, non-locking profile, which preferably is circumferential. For this purpose, in the embodiment example shown, the upper edge 5 is recessed in inward body direction in respect to the lower edge 4, in particular by means of a kind of recess of the vertical plane of the wear layer 2 and the vertical plane of the carrier plate 1.

Starting from this vertical plane of the carrier plate 1, a substantially horizontally arranged groove chamber 6 is extending in inward body direction.

Each groove chamber 6 comprises an upper surface or upper groove lip 16 and a lower surface or lower groove lip 17, which end in inward body direction at a substantially vertical surface 21. Each groove chamber comprises an undercut 7. In the embodiment example shown, to this aim the upper surface or upper groove lip 16 of the chamber 6 is arranged inclined in respect to the interface 18, such that the undercut 7 is created.

After finishing the panel installation, the mirrored joint shape created by adjoining adjacent panels 20a, 20n is filled up with a joint-filling material 11 hardening after application, in such a manner that the vertical section of the joint 8 as well as the groove chamber 6 formed with the undercut 7—so to speak, the horizontal section of the joint 8—will fill, by sufficient pressure, completely or partially with the plastic joint-filling material 11. The double hammer-shaped connection element formed after hardening of the joint-filling material 11 holds the panels 20a, 20n permanently by force-fitting as well as positive-fitting connection in the predetermined position both in a vertical direction, namely in its height location, as well as in a horizontal direction, namely in the panel plane.

Due to the lower protrusion of the panels 20*a*, 20*n* in respect to the upper edge of the panels 20*a*, 20*n*, adjacent panels 20*a*, 20*n* will meet each other at the lower side in a seamless manner and form a closed surface in respect to the subfloor. The exposed joint, in other words, has a closed configuration. The surface of the subfloor cannot become connected with the paste-like joint-filling material 11, which becomes rigid after hardening, and in this manner the complete acoustic uncoupling of the panel layer from the building structure is guaranteed.

The damage-free removal, the dismounting, respectively, of panels 20*a*, 20*n* can be performed by simply cutting open the joint 8 by means of a joint cutter or carpet knife such, that the panels 20*a*, 20*n* can be removed from the panel plane and, after cleaning the edges (side faces) from joint-filling material 11, can be inserted again in the same position. Thereafter, the joint 8 is filled with joint-filling material in a similar manner as described above.

According to the invention, the carrier plate 1 may consist at least for 80% of a mineral material, e.g., cement or gypsum or volcanic ash.

According to the invention, however, the carrier plate 1 may also consist at least for 80% of a wood-synthetic material blend (Wood Plastic Composite, WPC).

Another embodiment variant of the invention consists in that the upper side wear layer 2 comprises or consists of linoleum, of cork, of a multi-layer decor film, of polyurethane, of acrylate, of epoxy resin, of a filler or of wood.

According to another embodiment variant of the invention, the levelling layer 3 of the lower side comprises or consists of cork, of cardboard, of synthetic material or of rubber.

According to preferred embodiments of the invention, the recess of the upper edge 5 of the side face 12, 13, 14, 15 in respect to its lower edge 4 has a value lying between 0.5 mm and 5 mm;

In order to form the undercut 7 in the groove chamber 6, the value for the inclination, the pitch, respectively, of at least one of the surfaces 16, 17 forming the groove chamber 6 is between 0.5 degrees and 45 degrees, advantageously between 2 degrees and 20 degrees.

The width 18 of the exposed joint 8 is between 0.5 mm and 8.0 mm, preferably between 3.0 mm and 6.0 mm.

The thickness 9 (gauge) of the carrier plate 1 is between 4 mm and 20 mm, advantageously between 6 mm and 12 mm.

The lower side levelling layer 3 has a thickness 10 (gauge) between 1.0 mm and 3.0 mm.

The joint-filling material 11, which hardens after application, may be dispersion-based or epoxy resin-based or cement-based.

The invention also relates to a method for arranging a floor covering with a plurality of building elements 20*a*, . . . 20*n*, which correspond at least to one of the embodiment variants of the invention, wherein at least the process steps are provided of Installing a plurality of building elements 20*a*-20*n* next to each other, such that side faces of adjacent building elements 20*a*-20*n* facing each other are adjoining each other, such that, thus, an exposed joint (8) is formed, and subsequent filling of this exposed joint 8 along with the possible groove chambers 6, which are spatially connected to the exposed joint 8, with a joint-filling material 11, which hardens after being applied, as well as subsequent waiting time for hardening the joint-filling material (11).

The method according to the invention, for its further shaping, also comprises at least one of the further process steps disclosed in the application documents.

So to speak, the invention relates to a plate shaped building element, in particular a floor covering panel, which, apart from a mineral carrier plate or a carrier plate of WPC, comprises an upper side wear layer as well as preferably a lower side levelling layer, as well as to a floor covering in which such building elements are applied, and to a method for arranging those, wherein the side faces thereof comprise a, possibly identical, non-locking profile in order to form special joints for receiving a material for forming a connection element.

The present invention is in no way limited to the herein above-described embodiments, on the contrary may such building elements and methods be realized without leaving the scope of the present invention

REFERENCE LIST

1 Carrier plate
2 Wear layer
3 Levelling layer
4 Lower edge
5 Upper edge
6 Horizontal groove chamber
7 Undercut
8 Exposed joint
9 Thickness of carrier plate
10 Thickness of levelling layer
11 Joint-filling material
12 Side face
13 Side face
14 Side face
15 Side face
16 Upper surface of groove chamber (Pos. 6)
17 Lower surface of groove chamber (Pos. 6)
18 Interface (Between Pos. 1 and Pos. 2)
19 Width of exposed joint
20*a* Building element (in plate shape; floor covering panel)
20*n* n-th building element (in plate shape; floor covering panel)
21 vertical surface of the groove chamber (Pos. 6)

The invention claimed is:

1. A floor covering comprising a plurality of building elements having a plate shape, the building elements consisting essentially of:
   a carrier plate, and
   at least one upper side wear layer,
wherein:
   the building element comprises at least four sides,
   the at least four sides includes at least one pair of parallel opposite edges,
   each of the pair of parallel opposite edges comprises a non-locking profile,
   the non-locking profile comprises a recess of an upper edge of the building element with respect to a lower edge of the building element and a horizontal groove chamber extending in an inward body direction,
   the recess is a recess of the vertical plane of the upper side wear layer and the carrier plate,
   the horizontal groove chamber comprises an undercut, and an upper groove lip and a lower groove lip, wherein the lower groove lip protrudes beyond the upper groove lip, the lower groove lips of two adjacent building elements contact each other, an exposed joint having a width of 0.5 mm and 6 mm is formed between the two adjacent building elements, wherein the exposed joint includes the horizontal groove chamber which is spatially connected to the exposed joint, and the horizontal groove chamber including the undercut is completely filled up with a hardened joint-filling material, the carrier plate consists of at least 80% of a mineral material, and each of the building elements is a floor covering pane.

2. A floor covering comprising a plurality of building elements having a plate shape, the building elements consisting essentially of:

a carrier plate, and at least one upper side wear layer, wherein:

the building element comprises at least four sides, the at least four sides includes at least one pair of parallel opposite edges, each of the pair of parallel opposite edges comprises a non-locking profile, the non-locking profile comprises a recess of an upper edge of the building element with respect to a lower edge of the building element and a horizontal groove chamber extending in an inward body direction, the recess is a recess of the vertical plane of the upper side wear layer and the carrier plate, the horizontal groove chamber comprises an undercut, and an upper groove lip and a lower groove lip, wherein the lower groove lip protrudes beyond the upper groove lip, the lower groove lips of two adjacent building elements contact each other, an exposed joint having a width of 0.5 mm and 6 mm is formed between the two adjacent building elements, wherein the exposed joint includes the horizontal groove chamber which is spatially connected to the exposed joint, and the horizontal groove chamber including the undercut is completely filled up with a hardened joint-filling material, the carrier plate consists of at least 80% of a wood-synthetic material-blend, each of the building elements is a floor covering panel.

3. The floor covering of claim 2, wherein the building element further consists essentially of at least one lower side levelling layer.

4. The floor covering of claim 1, wherein all edges of the at least four sides comprise the non-locking profile.

5. The floor covering of claim 4, wherein the non-locking profiles are identical.

6. The floor covering of claim 1, wherein the building element further consists essentially of at least one lower side levelling layer.

7. The floor covering of claim 6, wherein the at least one lower side levelling layer consists essentially of cork, cardboard, synthetic material, or rubber.

8. The floor covering of claim 6, wherein the at least one lower side levelling layer has a thickness of 1.0 mm to 3.0 mm.

9. The floor covering of claim 1, wherein the carrier plate has a thickness between 4 mm and 20 mm.

10. The floor covering of claim 9, wherein the thickness is between 6 mm and 12 mm.

11. The floor covering of claim 1, wherein at least one surface defining the horizontal groove chamber, with respect to an interface of the carrier plate, has an inclination or pitch between 0.5 degrees and 45 degrees in order to define the undercut.

12. The floor covering of claim 11, wherein the inclination or pitch is between 2 degrees and 20 degrees.

13. The floor covering of claim 1, wherein the upper side wear layer comprises at least one selected from the group consisting of linoleum, cork, a multi-layered decor film, polyurethane, acrylate, epoxy resin, a filler, and wood.

14. The floor covering of claim 1, wherein the mineral material is cement, gypsum, or volcanic ash.

15. The floor covering of claim 1, wherein the exposed joint has a width between 3.0 mm and 6.0 mm.

16. The floor covering of claim 1, wherein the recess has a width of 0.5 mm to 5.0 mm.

17. The floor covering of claim 1, wherein the exposed joint is visible on an upper side of the building element and accessible therefrom.

18. The floor covering according to claim 1,
wherein the joint-filling material is dispersion-based, epoxy resin-based, or cement-based.

* * * * *